US012269059B2

(12) United States Patent
Ramies et al.

(10) Patent No.: US 12,269,059 B2
(45) Date of Patent: Apr. 8, 2025

(54) SILICONE COMPOSITIONS AND METHODS RELATED THERETO

(71) Applicant: NUSIL TECHNOLOGY LLC, Carpinteria, CA (US)

(72) Inventors: James Ramies, Carpinteria, CA (US); Roy Johnson, Carpinteria, CA (US); Brian Burkitt, Carpinteria, CA (US)

(73) Assignee: NUSIL TECHNOLOGY LLC, Carpinteria, CA (US)

( * ) Notice: Subject to any disclaimer, the term of this patent is extended or adjusted under 35 U.S.C. 154(b) by 350 days.

(21) Appl. No.: 17/078,390

(22) Filed: Oct. 23, 2020

(65) Prior Publication Data

US 2021/0121913 A1 Apr. 29, 2021

Related U.S. Application Data

(60) Provisional application No. 62/926,368, filed on Oct. 25, 2019.

(51) Int. Cl.
| | |
|---|---|
| *B05D 5/00* | (2006.01) |
| *B05D 3/00* | (2006.01) |
| *B05D 3/12* | (2006.01) |
| *C08K 3/22* | (2006.01) |
| *C08K 3/34* | (2006.01) |
| *C08K 3/36* | (2006.01) |
| *C09D 183/08* | (2006.01) |

(52) U.S. Cl.
CPC ............. *B05D 5/005* (2013.01); *B05D 3/007* (2013.01); *B05D 3/12* (2013.01); *C08K 3/22* (2013.01); *C08K 3/346* (2013.01); *C08K 3/36* (2013.01); *C09D 183/08* (2013.01); *C08K 2003/2241* (2013.01); *C08K 2201/005* (2013.01)

(58) Field of Classification Search
CPC .......... B05D 5/005; B05D 3/007; B05D 3/12; C08K 3/22; C08K 3/346; C08K 3/36; C08K 2003/2241; C08K 2201/005; C09D 183/08

See application file for complete search history.

(56) References Cited

U.S. PATENT DOCUMENTS

| | | | | |
|---|---|---|---|---|
| 4,034,140 A | * | 7/1977 | Przybyla | C08L 83/04 524/588 |
| 4,102,852 A | * | 7/1978 | DeLaTorre | C08K 5/54 524/588 |
| 4,405,425 A | * | 9/1983 | Schiller | C08K 3/04 524/400 |

(Continued)

FOREIGN PATENT DOCUMENTS

| | | |
|---|---|---|
| CN | 105754477 A | 7/2016 |
| CN | 107779015 | 3/2018 |
| WO | WO 2005/007763 | 1/2005 |

OTHER PUBLICATIONS

International Search Report and Written Opinion for PCT Application No. PCT/US2020/056994, filed Oct. 23, 2020, mailed on Jan. 25, 2021 (8 pages).

(Continued)

*Primary Examiner* — Robert S Walters, Jr.
(74) *Attorney, Agent, or Firm* — Ballard Spahr LLP

(57) ABSTRACT

A composition is described herein that includes a polysiloxane, a silicon based crosslinker, a reinforcement filler, a vulcanization catalyst, and a repair-enabling filler. Methods of using such a composition are also described.

21 Claims, 6 Drawing Sheets

(56) References Cited

U.S. PATENT DOCUMENTS

| | | | |
|---|---|---|---|
| 5,789,084 A * | 8/1998 | Nakamura | D06N 3/128 |
| | | | 524/265 |
| 5,928,778 A | 7/1999 | Takahashi et al. | 428/323 |
| 6,171,704 B1 | 1/2001 | Mosser et al. | |
| 6,316,119 B1 | 11/2001 | Metzger et al. | 428/520 |
| 6,699,586 B2 | 3/2004 | Edelmann et al. | 428/447 |
| 6,830,816 B2 | 12/2004 | Mehnert et al. | 428/423.1 |
| 7,250,467 B2 | 7/2007 | Hatanaka et al. | |
| 7,588,797 B2 | 9/2009 | Skoog et al. | |
| 9,512,342 B1 | 12/2016 | Gutman | |
| 9,546,300 B2 | 1/2017 | Bimanand et al. | |
| 10,604,660 B2 | 3/2020 | Smith et al. | |
| 2006/0099332 A1 | 5/2006 | Eriksson et al. | |
| 2011/0166280 A1 | 7/2011 | Davio et al. | |
| 2015/0140345 A1 | 5/2015 | Fukushima et al. | |

OTHER PUBLICATIONS

International Preliminary Report on Patentability was issued on Apr. 26, 2022 by the International Searching Authority for International Application No. PCT/US2020/056994 filed on Oct. 23, 2020 and published as WO2021/081287 (Applicant—Nusil Technology) (5 pages).

* cited by examiner

SILICONE COMPOSITIONS AND METHODS RELATED THERETO

CROSS-REFERENCE TO RELATED APPLICATIONS

This application claims the benefit of U.S. Provisional Application No. 62/926,368 filed Oct. 25, 2019, which is incorporated herein by reference in its entirety.

FIELD OF INVENTION

This disclosure relates to a composition that is suitable to be repaired when in the form of a coating, and methods for making, repairing, and using such a coating composition.

BACKGROUND

A coating is defined as a layer of material that is intended to protect a substrate underneath from the external environment. Thus, the coating protects the substrate from UV exposure, chemical exposure, physical impact, and temperature swings among other environmental events. The coatings are useful in a broad range of applications, such as coatings used in aerospace and defense industries (e.g. terrestrial and extra-terrestrial vehicles) to impart protective and functional properties.

At times the coatings can get damaged, such as a scuff, gouge, or small removal of material. It is desirable to repair the damaged coatings. This is most commonly done by sanding and reapplying a coating to a uniform thickness and homogeneity while preserving the desired properties.

There is a need for compositions that can be used as repairable coatings. There is also a need for methods related to the compositions that can be used as repairable coatings. Such a composition and methods related thereto are disclosed herein.

SUMMARY OF THE INVENTION

Disclosed herein is a composition comprising:
a) 100 parts by weight of a polysiloxane;
b) from 2 to 40 parts by weight of a silicon based crosslinker;
c) from 1 to 40 parts by weight of a reinforcing filler;
d) from 0.01 to 5 parts by weight of a vulcanization catalyst; and
e) from 30 to 130 parts by weight of a repair-enabling filler.

Also disclosed herein is a method comprising the steps of:
a) removing an area of a cured coating that is present on a substrate, thereby exposing the substrate;
b) smoothing the cured coating that borders the exposed substrate;
c) applying a composition disclosed herein to the exposed substrate;
d) curing the applied composition from step c); and
e) removing any excess of the cured applied composition, thereby repairing the cured coating on the substrate.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIG. 1A shows a photo of the sanded, tapered edge of a non-limiting composition on an aluminum substrate, at 200× zoom. FIG. 1B shows a height contour of the sanded, tapered edge of a non-limiting composition on an aluminum substrate, at 200× zoom. FIG. 1C shows a height profile of the sanded, tapered edge of a non-limiting composition on an aluminum substrate, at 200× zoom. Measurements were taken using a Keyence VHX-5000 digital microscope.

FIG. 2A shows a photo of gouges and built-up ridge of material caused by sanding a composition that does not contain repair-enabling filler, at 200× zoom. FIG. 2B shows a height contour of the built-up ridge of material caused by sanding a composition that does not contain repair-enabling filler, at 200× zoom. FIG. 2C shows a height profile of the built-up ridge of material caused by sanding a composition that does not contain repair-enabling filler, at 200× zoom. Measurements were taken using a Keyence VHX-5000 digital microscope.

DETAILED DESCRIPTION

Figure 1A:
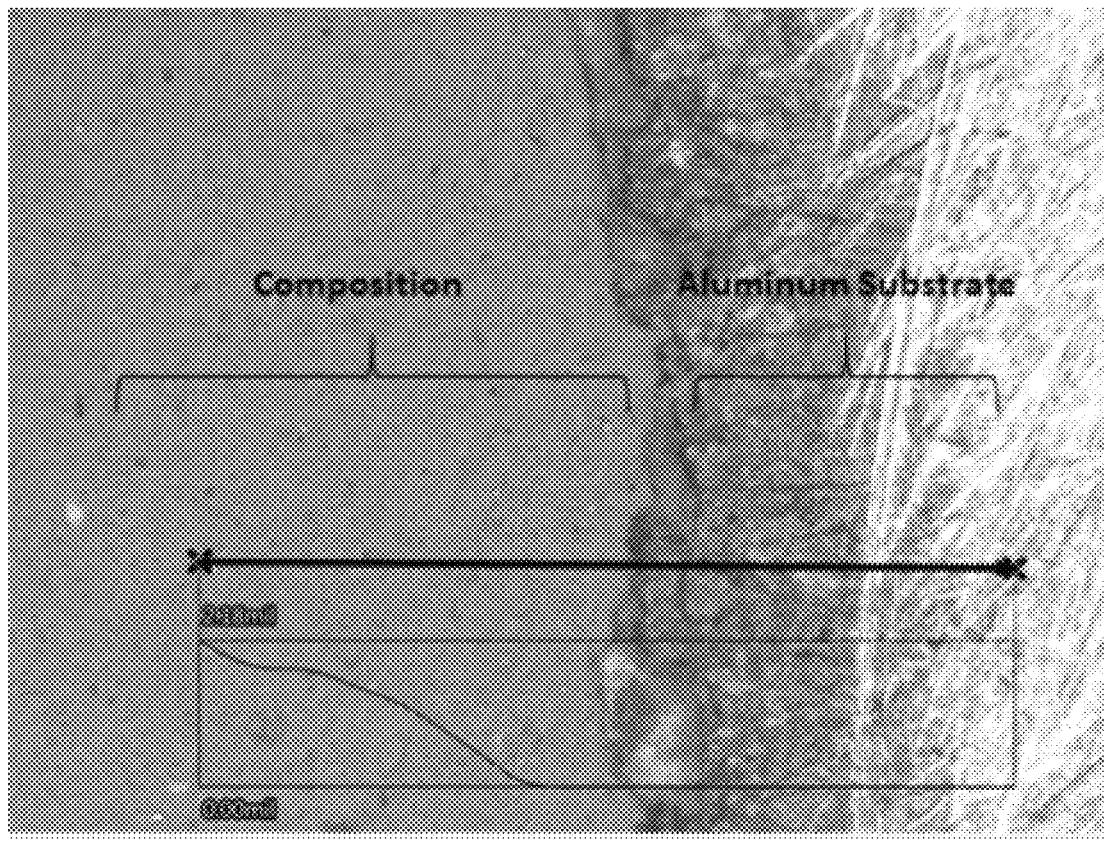
FIGS. 1A-1C show the performance of a non-limiting composition containing a repair-enabling filler disclosed herein after being sanded.

The present invention can be understood more readily by reference to the following detailed description of the invention and the examples included therein.

Before the present compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds and compositions can be given using common names as well as names assigned by the International Union of Pure and Applied Chemistry (IUPAC) and Chemical Abstracts Service (CAS) recommendations for nomenclature, hereby incorporated herein by reference. One of skill in the art can readily ascertain the structure of a compound and composition if given a name by systemic reduction of the compound structure using naming conventions.

As used in the specification and the appended claims, the singular forms "a," "an," and "the" include plural referents unless the context clearly dictates otherwise.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising 100 parts by weight of component X and from 9 to 40 parts by weight component Y, X and Y are present at a weight ratio of 100:9-40 or 0.09-0.4, and are present in such ratio regardless of whether additional components are contained in the composition.

Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

Figure 1B:
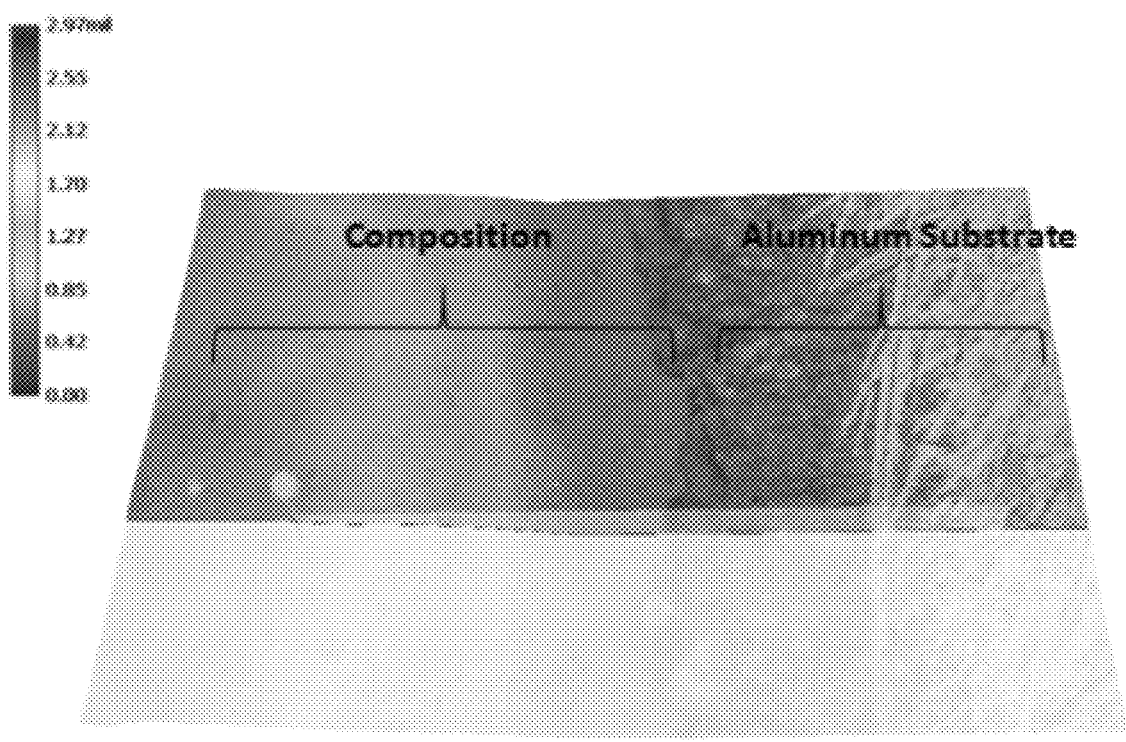
Figure 1C:
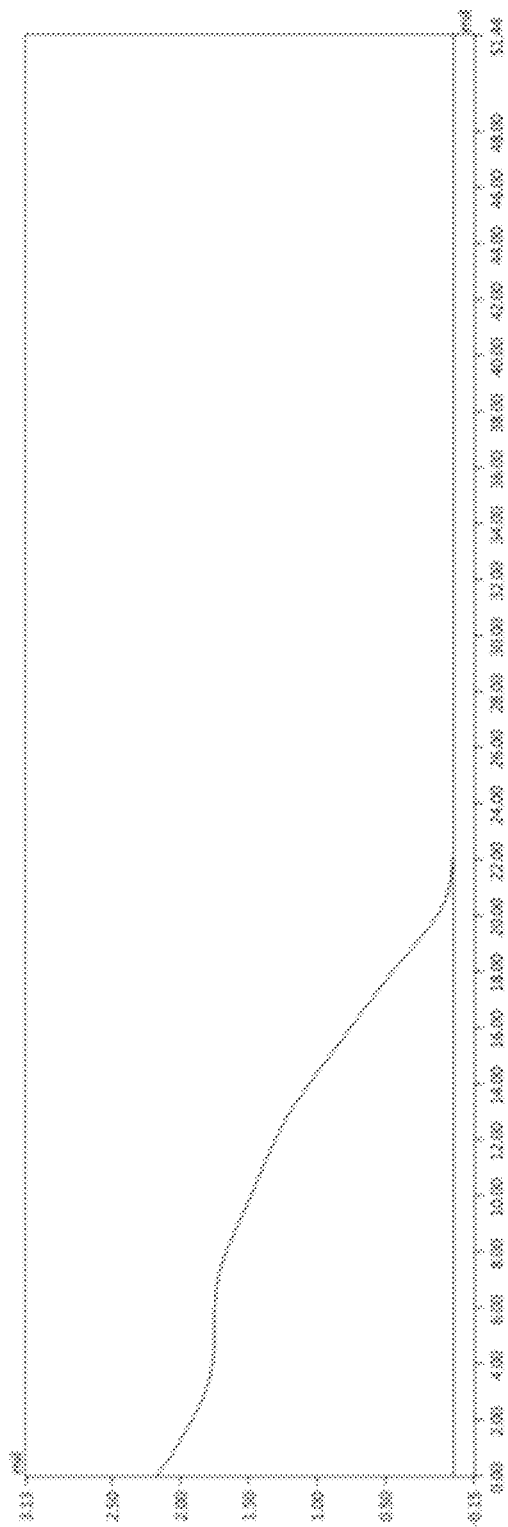
Figure 2A:
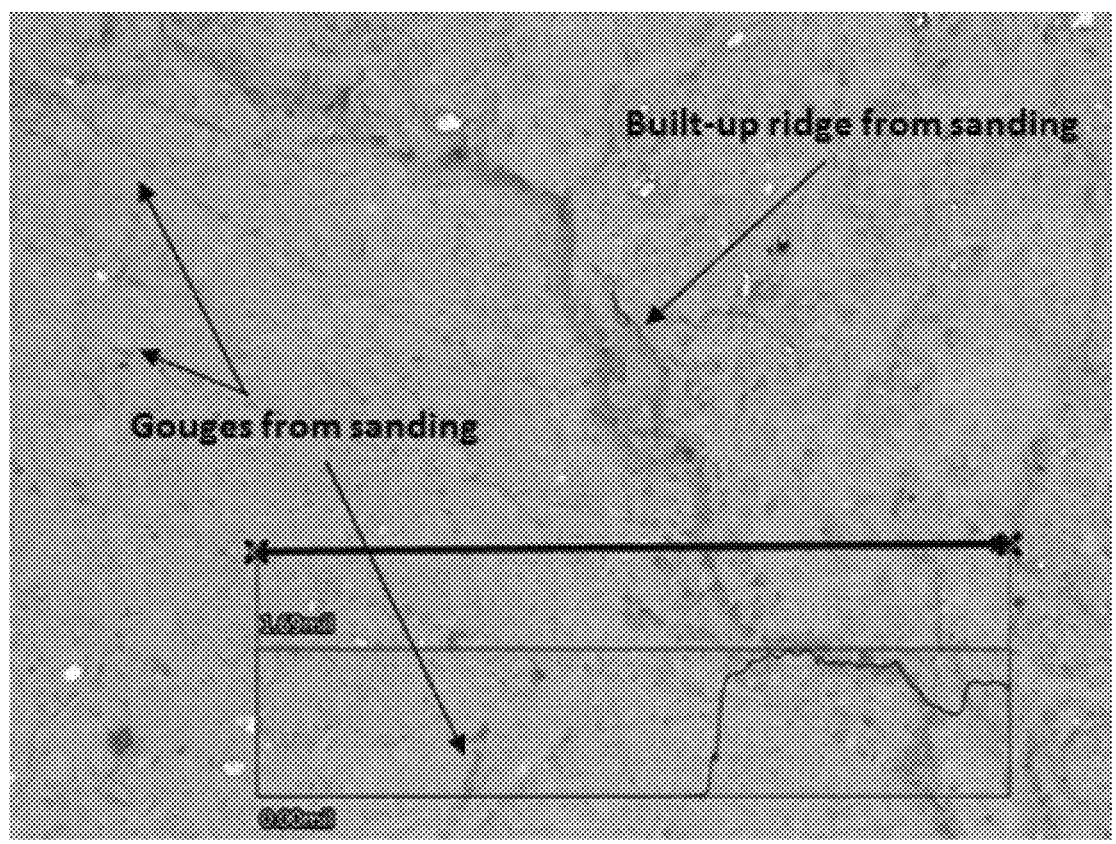
FIGS. 2A-2C show the performance of a control composition that does not contain a repair-enabling filler after being sanded.
Figure 2B:
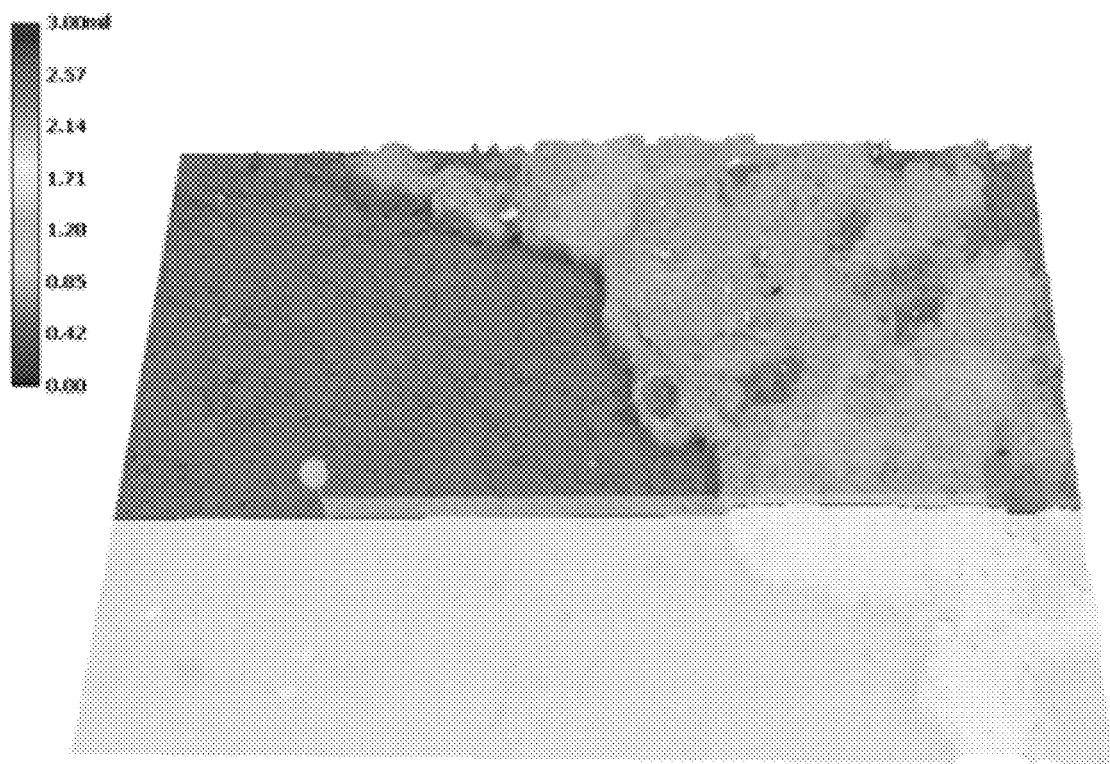
Figure 2C:
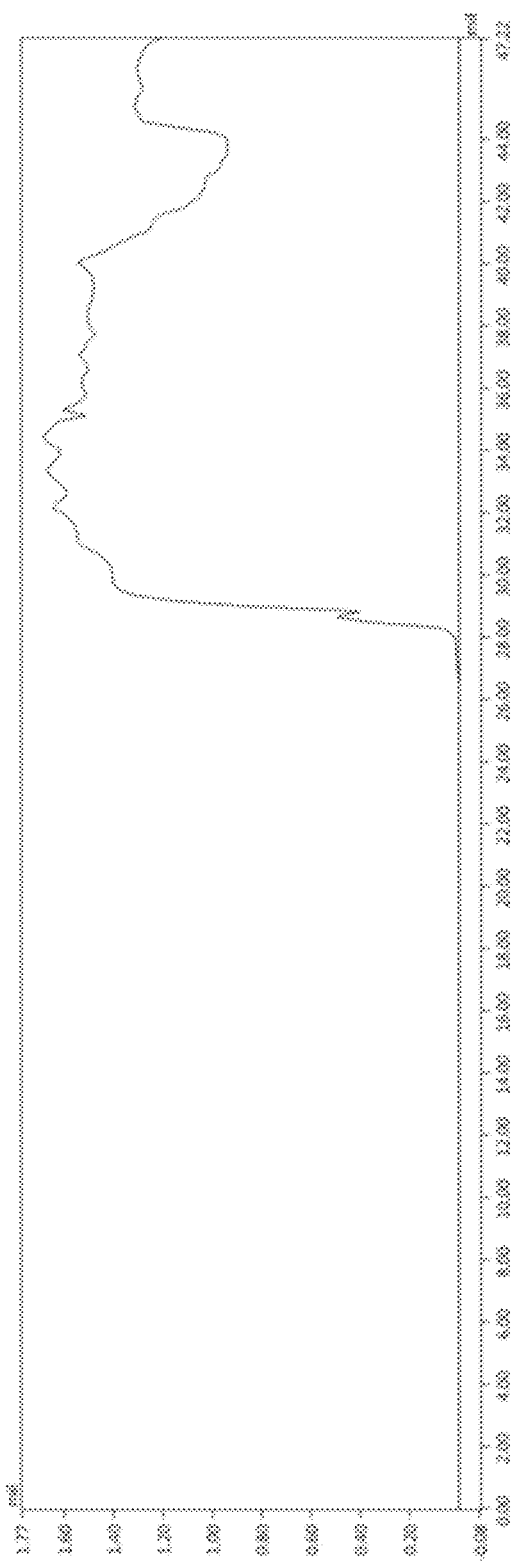

The composition disclosed herein comprises a repair-enabling filler. The repair-enabling filler in the composition prevents the composition from ripping, creating sharp edges, and/or delaminating when removed, via for example sanding. The repair-enabling filler makes the composition behave more like conventional polyurethanes, polyacrylates, or polycarbonates, which can be removed, via for example sanding, to be repaired to recover a homogenous coating with respect to appearance, composition and performance across the repair area. A repair-enabling filler in the amounts recited herein allows cured compositions disclosed herein to be sandable. The composition disclosed herein is not sandable without the presence of the repair-enabling filler in the amounts recited herein. The sandability of a composition is determined following the procedure in ASTM D-3322 section 6.17. Specifically, a damaged coating is present on a substrate, wherein the damaged portion of the is filled with a composition that is allowed to cure. The cured area and surrounding coating are sanded with a 220 grit sandpaper. The cured area is examined for gouging, deep scratches, and accumulation of material at surface. The composition is sandable if the cured area does not contain gouging, deep scratches, and accumulation of material at surface. A sandable composition allows for a smooth transition between the coating and the cured area. An example of such a smooth transition is shown in FIGS. 1A-1C. The composition is not sandable if the cured area contains gouging, deep scratches, or accumulation of material at surface. A non-sandable composition has a rough transition between the coating and the cured area. An example of such a rough transition and gouging is shown in FIGS. 2A-2C. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of embodiments described in the specification.

Disclosed are components to be used to prepare compositions to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular silicone composition is disclosed and discussed and a number of modifications that can be made to a number of compounds including the silicone compositions are discussed, specifically contemplated is each and every combination and permutation of the composition and modifications that are possible unless specifically indicated to the contrary. Thus, if a class of compounds A, B, and C are disclosed as well as a class of silicone compositions D, E, and F and an example of a composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using silicone compositions. Thus, if there are a variety of additional steps that can be performed, it is understood that each of these additional steps can be performed with any specific embodiment or combination of embodiments of the methods of the invention.

B. Composition

The composition disclosed herein is a silicone-based composition that can be applied to a variety of substrates to make a protective coating. Conventional protective coatings are made from polyurethanes, polyacrylates, or polycarbonates due to their high modulus and wide array of different chemistries, which makes them widely used as binders in coating systems. However, such conventional protective coatings often crack under modest strain due to their rigidity.

Silicones have some drawbacks to being used as protective coatings, because of their inherent flexibility and low hardness. However, silicones have properties that are desirable in protective coatings, such as being resistant to a range of organic solvents, being UV resistant, being resistant to cracking, being flexible, being moisture resistant, being thermally stable, and being able to have a broad operating temperature range making them desirable coating composition for a range of applications.

Another drawback with conventional silicone coatings is that they are difficult to repair. Repair of a coating should be done in a manner that allows for a smooth final coating without edges or sharp borders between the original coating and the newly added material that replaces the damaged portion of the original coating. Coatings are typically repaired by removing an area of the original coating that has been damaged to expose the underlying substrate. The remaining coating in close proximity to the exposed substrate is then smoothened. If needed, the smoothed and/or cleaned area can be cleaned. A new repair coating is applied to the smoothened substrate such that there is an overlap of the newly added repair coating and the original coating. The removal of the area of the original coating that has been damaged and the smoothening of the newly exposed area (coating and substrate) is typically done by sanding. Conventional silicone coatings cannot be removed as desired, for example via sanding, because the silicone coating rips apart creating sharp edges and delamination due to their inherent flexibility and low hardness.

The composition disclosed herein solves the repair problem with conventional silicone coatings while retaining the desired protective properties of silicone. Disclosed is a composition comprising:
 a) 100 parts by weight of a polysiloxane;
 b) from 2 to 40 parts by weight of a silicon based crosslinker;
 c) from 1 to 40 parts by weight of a reinforcing filler;
 d) from 0.01 to 5 parts by weight of a vulcanization catalyst; and
 e) from 30 to 130 parts by weight of a repair-enabling filler.

The composition disclosed herein is stable in the absence of moisture. That is, the polysiloxane and the silicon based crosslinker do not react to cure the composition. The composition cures upon exposure to moisture, such as the moisture present in ambient atmosphere, to give an elastomer. Thus, the composition can be kept in an essentially moisture free environment without curing. For example, the composition can be kept in a container, such as a single use container, which prevents moisture, such as moisture in the atmosphere, from coming into contact with the composition to unintentionally cure the composition. The composition can be applied to a surface from the container, such as the single use container, and be cured over time when exposed to the moisture in the atmosphere.

The reinforcing filler improves the overall physical properties of the final cured composition.

In one aspect, the composition further comprises one or more additives. The one or more additives can promote various properties of the composition, such as color, electrical conductivity, thermal conductivity, UV absorption, rheological control, and adhesion to substrates.

In one aspect, the composition further comprises a solvent. The addition of a solvent influences how the composition can be applied. For example, the composition with a solvent can be applied via a variety of techniques, such as, for example, via spray deposition, painting, and roll deposition.

In one aspect, the polysiloxane can be present in the composition from about 20 wt % to about 70 wt %. For example, the polysiloxane can be present in the composition from about 40 wt % to about 70 wt %. In another example, the polysiloxane can be present in the composition from about 50 wt % to about 70 wt %. In yet another example, the polysiloxane can be present in the composition from about 60 wt % to about 70 wt %. In yet another example, the polysiloxane can be present in the composition from about 20 wt % to about 50 wt %. In yet another example, the polysiloxane can be present in the composition from about 20 wt % to about 40 wt %.

In one aspect, the polysiloxane is a fluorosilicone, phenylsilicone, or methyl silicone. For example, the polysiloxane can be a fluorosilicone. In another example, the polysiloxane can be a phenylsilicone. In yet another example, the polysiloxane can be a methyl silicone.

In one aspect, the polysiloxane is a hydroxyl endblocked polydiorganosiloxane having a viscosity from 1000 to 250,000 cP at 25° C., and having organic radicals selected from the group consisting of methyl, ethyl, phenyl, and 3,3,3-trifluoropropyl. For example, the hydroxyl endblocked polydiorganosiloxane can have a viscosity from 1000 to 50,000 cP at 25° C. In one example, the hydroxyl endblocked polydiorganosiloxane can have an organic radical being methyl, ethyl, phenyl, and 3,3,3-trifluoropropyl. In another example, the hydroxyl endblocked polydiorganosiloxane can have an organic radical being ethyl. In one example, the hydroxyl endblocked polydiorganosiloxane can have an organic radical being phenyl. In one example, the hydroxyl endblocked polydiorganosiloxane can have an organic radical being 3,3,3-trifluoropropyl.

In one aspect, the hydroxyl endblocked polydiorganosiloxane can be polydimethylsiloxane, polymethyl-3,3,3-trifluoropropylsiloxane, polyethylmethylsiloxane, polydiethylsiloxane, or polydiorganosiloxanes, which are copolymers of two or more units of dimethylsiloxane units, diphenylsiloxane units, methylphenylsiloxane units, diethylsiloxane units or 3,3,3-trifluoropropylmethylsiloxane units. For example, the hydroxyl endblocked polydiorganosiloxane can also include mixtures and blends of polydiorganosiloxanes.

In one aspect, the fluorosilicone is a polymer capped at the molecular terminals with hydroxyl groups having a viscosity at 25° C. from 1,00 to 1,000,000 mPa*s represented by $OH(R^1R^2SiO)_nH$. $R^1$ is a monovalent hydrocarbon group having from 1 to 20 carbon atoms, from 50 to 100 mol % of $R^2$ are fluorine-substituted alkyl groups having from 1 to 12 carbon atoms, and "n" is a value such that the viscosity at 25° C. is from 1,000 to 1,000,000 mPa*s. Examples of the monovalent hydrocarbon group of $R^1$ and $R^2$ include methyl groups, hexyl groups, heptyl groups, and similar alkyl groups; vinyl groups, and similar alkenyl groups; phenyl groups, tolyl groups, xylyl groups, naphthyl groups, and similar aryl groups; benzyl groups, phenenthyl groups, and similar aralkyl groups; chloromethyl groups, 3-chloropropyl groups, 3,3,3-trifluoropropyl groups, nonafluorobutylethyl groups, and similar substituted alkyl groups. The fluorine-substituted alkyl group of $R^2$ represents an alkyl groups wherein one of more hydrogen is substituted by fluorine. Examples of the alkyl group include a methyl group, a thyl groups, a propyl groups, a butyl group, a pentyl group, a hexyl group, and a heptyl group. Examples of the fluorine-substituted alkyl group include a 3,3,3-trifluoropropyl group, a pentafluoroethyl group, a nonaluorobutylethyl group, and similar perfluoroalkyl groups.

In one aspect, the polysiloxane a linear polysiloxane. In another example, the polysiloxane a branched polysiloxane. A linear or branched polysiloxane can comprise pendant and/or terminal functional groups. For example, the functional group can be a reactive group. Non-limiting examples of reactive groups include —OH, —COOH, —CHO, —NH$_2$, —CH=CH$_2$, —NCO, and —N$_3$.

In one aspect, the silicon based crosslinker can be present in the composition from about 2 to 40 parts by weight. For example, the silicon based crosslinker can be present in the composition from about 8 to 40 parts by weight. In another example, the silicon based crosslinker can be present in the composition from about 10 to 30 parts by weight. In another example, the silicon based crosslinker can be present in the composition from about 15 to 30 parts by weight. In another example, the silicon based crosslinker can be present in the composition from 18 to 25 parts by weight.

In one aspect, the silicon based crosslinker can be a silane compound. In another aspect, the silicon based crosslinker can be a polysiloxane. In one aspect, the silicon based crosslinker being a polysiloxane can be a linear polysiloxane. In another example, the polysiloxane a branched polysiloxane. A linear or branched polysiloxane being a silicon based crosslinker can comprise pendant and/or terminal functional groups. For example, the functional group can be a reactive group. Non-limiting examples of reactive groups include —OH, —COOH, —CHO, —NH$_2$, —CH=CH$_2$, —NCO, and —N$_3$.

In one aspect, the silicon based crosslinker can be an acetoxysilicon compound. Suitable non-limiting examples of acetoxysilicon compounds include organotriacetoxysilanes and organodiacetoxysilanes. Suitable non-limiting examples of organotriacetoxysilane compounds include vinyltriacetoxysilane, ethyltriacetoxysilane, methyltriacetoxysilane, phenyltriacetoxysilane, and 3-methacryloxypropyltriacetoxysilane, propyltriacetoxysilane; organodiacetoxysilanes such as dimethyldiacetoxysilane, dibenzyloxydiacetoxysilane, di-t-butoxydiacetoxysilane, and vinylmethyldiacetoxysilane.

In one aspect, the silicon based crosslinker can be an alkoxysilicon compound. Suitable non-limiting examples of an alkoxysilicon compound include an orthosilicate, an alkylpolysilicate, a monoorganotrialkoxysilane, Si(OCH$_2$CH$_2$OCH$_3$)$_4$, Si(OCH$_2$CH$_2$OCH$_2$CH$_3$)$_4$, C$_6$H$_5$Si(OCH$_2$CH$_2$OCH$_3$)$_3$, and CF$_3$CH$_2$CH$_2$Si(OCH$_2$CH$_2$OCH$_3$)$_3$. Suitable non-limiting examples of alkoxysilicon compounds include orthosilicates such as ethylorthosilicate, n-propylorthosilicate, amylorthosilicate, pentenylorthosilicate, diethyldipropylorthosilicate and hexylorthosilicate; alkylpolysilicates such as methylpolysilicate, ethylpolysilicate, isopropylpolysilicate, n-propylpolysilicate, secondary amylpolysilicate and n-butylpolysilicate; monoorganotrialkoxysilanes such as methyltrimethoxysilane, ethyltriethoxysilane, propyltrimethoxysilane, methyltriisopropoxysilane, phenyltrimethoxysilane, vinyltrimethoxysilane; and other alkoxysilicon compounds such as Si(OCH$_2$CH$_2$OCH$_3$)$_4$, Si(OCH$_2$CH$_2$OCH$_2$CH$_3$)$_4$, C$_6$H$_5$Si(OCH$_2$CH$_2$OCH$_3$)$_3$, and CF$_3$CH$_2$CH$_2$Si(OCH$_2$CH$_2$OCH$_3$)$_3$.

In one aspect, the silicon based crosslinker can be an organosilane with the formula R$^3_a$SiX$_{4-a}$, wherein R$^3$ is a monovalent hydrocarbon group having from 1 to 10 carbon atoms, X is a hydrolysable group, and "a" is 0 or, and an organosiloxane oligomer, which is a partially hydrolyzed condensate of said organosilane. Examples of the monovalent hydrocarbon group of R$^3$ include methyl groups, ethyl groups, propyl groups, butyl groups, pentyl groups, hexyl groups, heptyl groups, and similar alkyl groups; vinyl groups, allyl groups, butenyl groups, pentenyl groups, hexenyl groups, and similar alkenyl groups; phenyl groups, tolyl groups, xylyl groups, naphthyl groups, and similar aryl groups; benzyl groups, phenethyl groups, and similar aralkyl groups; chloromethyl groups, 3-chloropropyl groups, 3,3,3-trifluoropropyl groups, nonafluorobutylethyl groups, and similar substituted alkyl groups. Examples of X include dimethylketoximo groups, methylethyl ketoximo groups, and similar ketoximo groups (also called "ketoximino groups", i.e. groups represented by the general formula: —O—N=CR$^4$R$^5$ (wherein Rand Rare identical or different alkyl groups, preferably alkyl groups having from 1 to 6 carbon atoms)); methoxy groups, ethoxy groups, and similar alkoxy groups; acetoxy groups and similar acyloxy groups; N-butylamino groups, N,N-diethylamino groups, and similar alkylamino groups; N-methylacetamide groups and similar acylamide groups; N,N-diethylaminoxy groups and similar N,N-dialkylaminoxy groups; and propenoxy groups and similar alkenyloxy groups. Of these, ketoximo groups and acyloxy groups are preferable.

In one aspect the formula R$^3_a$SiX$_{4-a}$ can be a tetraketoximosilane, a triketoximosilane, a triacetoxysilane, or a mixture thereof. Examples of the triketoximosilane include, but are not limited to, methyl triketoximosilane and vinyl triketoximosilane. Examples of the triacetoxysilane include, but are not limited to, methyl triacetoxysilane and ethyl triacetoxysilane.

It is understood that the polysiloxane and the silicon based crosslinker contain moieties that are compatible to crosslink in the presence of the vulcanization catalyst.

In one aspect, the composition cures through the condensation of acetoxys, alkoxys, or oximes bonded to silicon and hydroxyls bonded to silicon in the presence of a vulcanization catalyst. The condensation reaction can occur at room temperature.

In one aspect, the vulcanization catalyst can a metal salt of carboxylic acids. In one aspect, the vulcanization catalyst can a tin based catalyst. Suitable non-limiting vulcanization catalysts include lead naphthenate, cobalt naphthenate, zinc naphthenate, sodium naphthenate, iron-2-ethylhexoate, lead 2-ethylhexoate, chromium octoate, dibutyltin dibenzoate, dibutyltin adipate, lead sebacate, dibutyltin dilactate, dibutyltindiacetate, dibutyltindilaurate, lead octoate, tin ricinoleate, cobalt hexoate, aluminum acetyl-acetonate, zirconium acetoacetate, dioctyltindimaleinate, and stannous octoate.

In one aspect, the vulcanization catalyst can be present in the composition from 0.01 to 5 parts by weight. For example, the vulcanization catalyst can be present in the composition from 0.1 to 5 parts by weight. In another example, the vulcanization catalyst can be present in the composition from 0.1 to 2 parts by weight. In yet another example, the vulcanization catalyst can be present in the composition from 0.1 to 1 parts by weight. In yet another example, the vulcanization catalyst can be present in the composition from 0.1 to 0.5 parts by weight.

In one aspect, the substrate can be a metal. Suitable non-limiting examples of metal substrates include iron, steel, stainless steel, aluminum, titanium, copper, tin, nickel, cobalt, and alloys thereof.

In another aspect, the substrate can be a carbon fiber. In yet another aspect, the substrate can be a composite material. In yet another aspect, the substrate can be paint, for example paint on aircrafts or vehicles.

In another aspect, the substrate can be plastics. Suitable non-limiting examples of plastic substrates include polycarbonate, polysulfone, polyacrylate, polyurethane, and polyethylenes. In yet another aspect, the substrate can be a silicone substrate.

In one aspect, the substrate can be a substrate on an aircraft. In another aspect, the substrate can be a substrate on a vehicle, such as a terrestrial or extra-terrestrial vehicle.

In one aspect, the repair-enabling filler can be present in an amount from about 30 to 130 parts by weight, such that the cured coating maintains flexibility to the extent that it is able to elongate a minimum of 40% without being permanently damaged. For example, the repair-enabling filler can be present in an amount from 40 to 130 parts by weight. In another example, the repair-enabling filler can be present in an amount from 60 to 130 parts by weight. In yet another example, the repair-enabling filler can be present in an amount 80 to 130 parts by weight. In yet another example, the repair-enabling filler can be present in an amount from 100 to 130 parts by weight. In yet another example, the repair-enabling filler can be present in an amount from 30 to 110 parts by weight. In yet another example, the repair-enabling filler can be present in an amount from 30 to 90 parts by weight. In yet another example, the repair-enabling filler can be present in an amount from 30 to 70 parts by weight. In yet another example, the repair-enabling filler can be present in an amount from 30 wt to 50 parts by weight. In yet another example, the repair-enabling filler can be present in an amount from 70 to 100 parts by weight. In yet another example, the repair-enabling filler can be present in an amount from 80 to 90 parts by weight.

In one aspect, the repair-enabling filler are particles having an average particle size from about 100 nm to 250 μm. For example, the repair-enabling filler are particles that can have an average particle size from about 100 nm to 50 μm. In another example, the repair-enabling filler are particles that can have an average particle size from about 100 nm to 25 μm. In yet another example, the repair-enabling filler are particles that can have an average particle size from about 100 nm to 10 μm. In yet another example, the repair-enabling filler are particles that can have an average particle size from about 100 nm to 5 μm. In yet another example, the repair-enabling filler are particles that can have an average particle size from about 100 nm to 1 μm. In yet another example, the repair-enabling filler are particles that can have an average particle size from about 1 μm to 250 μm. In yet another example, the repair-enabling filler are particles that can have an average particle size from about 5 μm to 250 μm. In yet another example, the repair-enabling filler are particles that can have an average particle size from about 10 μm to 250 μm. In yet another example, the repair-enabling filler are particles that can have an average particle size from about 1 μm to 50 μm. In yet another example, the repair-enabling filler are particles that can have an average particle size from about 1 μm to 25 μm. In yet another example, the repair-enabling filler are particles that can have an average particle size from about 5 μm to 25 μm.

In one aspect, the repair-enabling filler is homogenously dispersed in the composition.

The repair-enabling filler is a solid material, for example a crystalline material. The solid material, such as the crystalline material, typically has an asymmetrical three-dimensional shape. Microstructures of said filler can have high aspect ratios which facilitate removal by surface shear. In one aspect, the crystalline structure of the repair-enabling filler can be cubic, tetrahedral, hexagonal, monoclinic, triclinic, rhombohedral, or orthorhombic. That is, the solid material, such as the crystalline material, is typically not spherical.

In one aspect, the repair-enabling filler comprises a material selected from the group consisting of quartz, titania, and fused silica, or a combination thereof. For example, the repair-enabling filler can comprise quartz. In another example, the repair-enabling filler can comprise titania. In another example, the repair-enabling filler can comprise fused silica. It should be appreciated that the repair-enabling fillers, such as quartz, titania, and fused silica, makes the cured composition sandable. The size and shape of the repair-enabling fillers, such as quartz, titania, and fused silica, is important in addition to the type of material itself. As shown in the examples, certain grades of quartz function as a repair-enabling filler, while other grades of quartz do not function as a repair-enabling filler.

In one aspect, when the composition further comprises a reinforcing filler, the reinforcing filler can be fumed silica, precipitated silica, silicone resins, nanosilicas, clay, cellulose, calcium silicate, magnesium carbonate, or carbon black. The reinforcing filler can be surface treated (e.g. trimethylsilyl treated).

In one aspect, when the composition further comprises a reinforcing filler, the reinforcing filler can be present in the composition from 1 to 40 parts by weight. For example, when the composition further comprises a reinforcing filler, the reinforcing filler can be present in the composition from 1 to 30 parts by weight. In another example, when the composition further comprises a reinforcing filler, the reinforcing filler can be present in the composition from 1 to 20 parts by weight. In yet another example, when the composition further comprises a reinforcing filler, the reinforcing filler can be present in the composition from 5 to 10 parts by weight. In yet another example, the reinforcing filler can be present in the composition from 10 to 20 parts by weight.

In one aspect, the composition comprises:
a) 100 parts by weight of a polysiloxane;
b) from 15 to 25 parts by weight of a silicon based crosslinker;
c) from 10 to 20 parts by weight of a reinforcing filler;
d) from 0.1 to 0.5 parts by weight of a vulcanization catalyst; and
e) from 70 to 100 parts by weight of a repair-enabling filler.

In one aspect, other components can be present as additives to further enhance the performance of the composition. When the composition comprises one or more additives, the one or more additives can be selected from the group consisting of a colorant, an electrically conductive material, a thermally conductive material, an UV absorber, an adhesion promoter, matting agents, or a combination thereof. Examples of suitable additive materials include but are not limited to: particulate forms of oxides of titanium, cerium, aluminum, zirconium and other metals and metalloids present with or without surface modification; carbon nanotubes, graphite, graphene, glass fibers, inorganic fillers such as talc, carborundum, mica, boron nitride, inorganic fillers such as clay, kaolin, calcium carbonate, fillers of biological origin such as polysaccharides, and suitable combinations thereof. The functional additives may be dissolved or dispersed in the final composition.

The one or more additives can be present at a loading of greater than 0 to 400 parts by weight. For example, the one or more additives can be present at a loading of 1 to 300 parts by weight. In another example, the one or more additives can be present at a loading of 5 to 200 parts by weight. In another example, the one or more additives can be present at a loading of 10 to 100 parts by weight. In a preferred example, the one or more additives can be present at a loading of 20 to 40 parts by weight. The only limitations on the additives is that they must not be present in aggregate amounts such that the sandability provided by the repair enabling filler is negatively impacted, or that the flexibility of the material is reduced below 40% elongation.

In one aspect, when the additive comprises a colorant, the colorant can be a combination of one or more organic or inorganic compounds. Non-limiting examples of suitable organic compounds may include azo pigments, phthalocyanine pigments, quinacridone pigments. Non-limiting examples of suitable inorganic compounds may include carbon blacks, oxides or sulfides of metals such as titanium dioxide, iron oxide, cadmium sulfide, or chromia.

In one aspect, when the additive comprises an electrically conductive material, the additive may consist of one or more electrically conductive materials. Non-limiting examples of electrically conductive fillers may include graphite, graphene, carbon nanotubes, powders of metals such as silver or gold, metal shavings, and metal coated particles.

In one aspect, when the additive comprises a thermally conductive material, the additive may consist of one or more thermally conductive materials. Non-limiting examples of thermally conductive materials may include graphite, graphene, carbon nanotubes, carbon blacks; carbides, nitrides, and oxides of metals like boron nitride, silicon carbide, or aluminum oxide, In one aspect, when the additive comprises a UV absorber, the UV absorber can be one or more compounds that absorb harmful ultraviolet radiation and dissipate it as heat. Non-limiting examples of suitable UV absorbers may include a benzo compound, an aryl ester, an oxanilide, an acrylic ester, and formamidine.

In one aspect, the composition can further comprise a solvent, which is used to reduce viscosity and improve ease of application of the composition. The amount of solvent necessary to reduce viscosity is dependent on solvent type and user application. One skilled in the art will choose the appropriate solvent and amount necessary for their application.

In one aspect, when the composition further comprises a solvent, the solvent can be a volatile organic solvent. The solvent must be non-reactive with the polysiloxane and the silicone based crosslinker and other active ingredients in the composition. The purpose of this solvent is to dilute the composition by dissolving or suspending it to create an easily spreadable composition having a viscosity suitable for application to the substrate. Non-limiting examples of suitable solvents include petroleum fractions such as standard solvent and naphtha; alcohols, particularly C—C4 alcohols, such as methyl, ethyl, propyl, isopropyl, butyl, isobutyl and tert-butyl alcohols; esters including C—C4 esters, such as ethyl acetate, methyl acetate, tert-butyl acetate, and propyl acetate; chlorinated hydrocarbons such as 1,1,1-trichloroethane, perchloroethylene triohloromethane, methylene dichloride and other halogenated hydrocarbons such as freons; aromatic hydrocarbons such as toluene, xylene and ethyl benzene; aliphatic hydrocarbons such as hexane, heptane and cyclohexane; glycol ethers such as the ethylene glycolmethyl ether, ethylene glycol butyl ether; proprietary solvents such as Cellosolve, a product of Union Carbide, or Dowanol, a product of Dow Chemical Company; and ketones such as dimethyl ketone and methyl ethyl ketone. Mixtures of the foregoing solvents may also be used.

In one aspect, when the composition further comprises a solvent, the solvent can be present in the composition from about 1 to 500 parts by weight of polysiloxane. For example, when the composition further comprises a solvent, the solvent can be present in the composition from 100 to 450 parts by weight of polysiloxane. For example, when the composition further comprises a solvent, the solvent can be present in the composition from 200 to 400 parts by weight of polysiloxane. In a preferred example, when the composition further comprises a solvent, the solvent can be present in the composition from 300 400 parts by weight of polysilosane.

In one aspect, the composition disclosed herein can be used in a one-component configuration. That is, all components of the composition are together in a single container, such as a single barrel applicator, prior to use and curing. The composition disclosed herein can alternatively be used in a two-component configuration. That is, one or more of the components are separated from the other components in the composition until they are all mixed together just prior to application. For example, the silicon based crosslinker and/or vulcanization catalyst can be separated from the other components prior to mixing and application. A two-component configuration can be present in a two-chamber type applicator, such as a double barrel applicator.

In one aspect, the composition is cured. A cured composition means that the polysiloxane and the silicon based crosslinker has crosslink in the presence of the vulcanization catalyst. The cured composition can be a coating in solid form having a uniform thickness.

In one aspect, the composition is a coating having a thickness from about 5 μm to about 1000 μm. For example, the composition can be a coating having a thickness from about 5 μm to about 300 μm. In another example, the composition can be a coating having a thickness from about 5 μm to about 100 μm. In yet another example, the composition can be a coating having a thickness from about 5 μm to about 50 μm. In yet another example, the composition can be a coating having a thickness from about 20 μm to about 100 μm. In yet another example, the composition can be a coating having a thickness from about 20 μm to about 500 μm. In yet another example, the composition can be a coating having a thickness from about 50 μm to about 500 μm. In yet another example, the composition can be a coating having a thickness from about 100 μm to about 1000 μm.

Also disclosed herein is a kit comprising:
a) 100 parts by weight of a polysiloxane;
b) from 2 to 40 parts by weight of a silicon based crosslinker;
c) from 1 to 40 parts by weight of a reinforcing filler;
d) from 0.01 to 5 parts by weight of a vulcanization catalyst;
e) from 30 to 130 parts by weight of a repair-enabling filler; and
f) a container containing parts a)-e)

In one aspect, the container is a single chamber container, wherein parts a)-e) are all present in the single chamber. In another aspect, the container is a double chamber container, wherein some of parts a)-e) are present in one chamber and the remaining parts of parts a)-e) are present in the other chamber.

In one aspect, the kit further comprises instructions for use.

C. Methods

Also disclosed herein, is a method of using the composition disclosed herein. The composition disclosed herein can be used as an original coating on a substrate. The composition disclosed herein can be used to repair an original coating on a substrate.

Disclosed herein is a method comprising the steps of:
a) removing an area of a cured coating that is present on a substrate, thereby exposing the substrate;
b) smoothing the cured coating that borders the exposed substrate;
c) applying a composition disclosed herein to the exposed substrate;
d) curing the applied composition from step c); and
e) removing any excess from the cured applied composition, thereby repairing the cured coating on the substrate.

In one aspect, the cured coating has a defect. Defects include, but are not limited to, delamination, tear, scuff, removed area of the cured coating, bubbling, and score. As such, the step of removing an area of a cured coating that is present on a substrate, thereby exposing the substrate can remove the defect. The step of removing an area of a cured coating that is present on a substrate, thereby exposing the substrate can remove an area in need of repair in the cured coating.

In one aspect, the step of removing an area of a cured coating that is present on a substrate, thereby exposing the substrate only removes a portion of the cured film. In this aspect, not the entire cured film is removed in step a).

A technique for removal of an area of cured coating can be described in ASTM D3322-*Standard Practice for Testing Primers and Primer Surfacers Over Preformed Metal*, whereby the composition is abraded with sandpaper and the composition surface examined for gouges or deep scratches. Additionally, the sandpaper is evaluated for clogging or buildup of material. The ASTM mentions but does not limit itself to using 400 grit sandpaper.

The removal of the area of a cured coating that is present on a substrate, thereby exposing the substrate can be done such that there is a smooth transition from substrate to the cured coating. The smooth transition can be a gradual transition from the substrate to the top surface of the coating. This can be achieved via for example sanding with a sandpaper. The sanding can remove a desired area of the cured coating to expose the substrate leaving a smooth transition from the substrate to the cured coating.

In one aspect, the removal of the area of a cured coating that is present on a substrate, thereby exposing the substrate can be done such that removed cured coating becomes a powder without the remaining cured coating being torn away or beading or otherwise being damaged.

In one aspect, the cured coating has a thickness from about 5 μm to about 1000 μm. For example, the cured coating can have a thickness from about 5 μm to about 300 μm. In another example, the cured coating can have a thickness from about 5 μm to about 100 μm. In yet another example, the cured coating can have a thickness from about 5 μm to about 50 μm. In yet another example, the cured coating can have a thickness from about 20 μm to about 100 μm. In yet another example, the cured coating can have a thickness from about 20 μm to about 500 μm. In yet another example, the cured coating can have a thickness from about 50 μm to about 500 μm. In yet another example, the cured coating can have a thickness from about 100 μm to about 1000 μm. For example, after the step of removing the area of a cured coating that is present on a substrate, thereby exposing the substrate can be done such that there is a gradual thickness of the cured coating starting from the exposed part of the substrate towards the top surface of the cured coating.

In one aspect, steps a) and b) are performed simultaneously. That is, the removal of the removing the area of a cured coating that is present on a substrate, thereby exposing the substrate is done by a process that also smoothing the cured coating that borders the exposed substrate. Such a process can comprise sanding.

In one aspect, the method further comprises prior to step c) cleaning the smoothened area of the exposed substrate. The substrate can be cleaned so that the composition disclosed herein can better adhere to the substrate upon application.

In one aspect, the step of applying a composition disclosed herein to the exposed substrate can comprise applying the composition via spray coating, brush coating, dip coating, or roll coating.

In one aspect, the step of applying a composition disclosed herein to the exposed substrate can comprise applying the composition such that the applied composition has a thickness that is substantially the same as the thickness of the cured coating.

In one aspect, the applied composition has a uniform thickness. In one aspect, the applied composition has a thickness from about 5 μm to about 1000 μm. For example, the applied composition can have a thickness from about 5 μm to about 300 μm. In another example, the applied composition can have a thickness from about 5 μm to about 100 μm. In yet another example, the applied composition can have a thickness from about 5 μm to about 50 μm. In yet another example, the applied composition can have a thickness from about 20 μm to about 100 μm. In yet another example, the applied composition can have a thickness from about 20 μm to about 500 μm. In yet another example, the applied composition can have a thickness from about 50 μm to about 500 μm. In yet another example, the applied composition can have a thickness from about 100 μm to about 1000 μm.

In one aspect, the step of applying a composition disclosed herein to the exposed substrate can be done such that there is smooth transition from the applied composition and the cured coating.

In one aspect, the substrate can be a metal. Suitable non-limiting examples of metal substrates include iron, steel, stainless steel, aluminum, titanium, copper, tin, nickel, cobalt, and alloys thereof.

In another aspect, the substrate can be a carbon fiber. In yet another aspect, the substrate can be a composite material. In yet another aspect, the substrate can be paint, for example paint on aircrafts or vehicles.

In another aspect, the substrate can be plastics. Suitable non-limiting examples of plastic substrates include polycarbonate, polysulfone, polyacrylate, polyurethane, and polyethylenes. In yet another aspect, the substrate can be a silicone substrate.

In one aspect, the substrate can be a substrate on an aircraft. In another aspect, the substrate can be a substrate on a vehicle, such as a terrestrial or extra-terrestrial vehicle.

In one aspect, the step of curing the applied composition from step c), thereby repairing the cured coating on the substrate can be done over a period of time. For example, the step of curing the applied composition from step c), thereby repairing the cured coating on the substrate can be done from 1 min to 120 hours. In another example, the step of curing the applied composition from step c), thereby repairing the cured coating on the substrate can be done from 1 min to 96 hours. In yet another example, the step of curing the applied composition from step c), thereby repairing the cured coating on the substrate can be done from 1 min to 72 hours. In yet another example, the step of curing the applied composition from step c), thereby repairing the cured coating on the substrate can be done from 1 min to 48 hours. In yet another example, the step of curing the applied composition from step c), thereby repairing the cured coating on the substrate can be done from 1 min to 24 hours. In yet another example, the step of curing the applied composition from step c), thereby repairing the cured coating on the substrate can be done from 1 min to 12 hours.

In one aspect, the step of curing the applied composition from step c), thereby repairing the cured coating on the substrate can be done at room temperature. In another example, the step of curing the applied composition from step c), thereby repairing the cured coating on the substrate can be done at a temperature from about 15° C. to about 100° C. In yet another example, the step of curing the applied composition from step c), thereby repairing the cured coating on the substrate can be done at a temperature from about 15° C. to about 80° C. In yet another example, the step of curing the applied composition from step c), thereby repairing the cured coating on the substrate can be done at a temperature from about 15° C. to about 60° C. In yet another example, the step of curing the applied composition from step c), thereby repairing the cured coating on the substrate can be done at a temperature from about 15° C. to about 40° C. In yet another example, the step of curing the applied composition from step c), thereby repairing the cured coating on the substrate can be done at a temperature from about 15° C. to about 30° C. In yet another example, the step of curing the applied composition from step c), thereby repairing the cured coating on the substrate can be done at a temperature from about 15° C. to about 25° C. In general, a higher temperature makes the applied composition from step c) cure quicker. In all cases a relative humidity of 20% to 100% is required for cure.

In one aspect, the cured applied composition from step c) is indistinguishable from the cured coating.

In one aspect, the cured coating that is present on the substrate has a composition disclosed herein. In one aspect, the cured coating and the applied composition from step c) are identical compositions, both which are described herein.

D. Aspects

In view of the disclosure herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A composition comprising:
a) 100 parts by weight of a polysiloxane;
b) from 2 to 40 parts by weight of a silicon based crosslinker;
c) from 1 to 40 parts by weight of a reinforcing filler;
d) from 0.01 to 5 parts by weight of a vulcanization catalyst; and
e) from 30 to 130 parts by weight of a repair-enabling filler.

Aspect 2: The composition of aspect 1, wherein the polysiloxane is a hydroxyl endblocked polydiorganosiloxane having a viscosity from 1000 to 250,000 cP at 25° C. and having one or more different organic radicals selected from the group consisting of methyl, ethyl, phenyl, and 3,3,3-trifluoropropyl.

Aspect 3: The composition of aspects 1 or 2, wherein the silicon based crosslinker is an alkoxysilicon compound.

Aspect 4: The composition of aspects 1 or 2, wherein the silicon based crosslinker is an acetoxysilicon compound.

Aspect 5: The composition of aspects 1 or 2, wherein the silicon based crosslinker is a ketoximosilicon compound.

Aspect 6: The composition of any one of aspects 1-5, wherein the polysiloxane is a fluorosilicone.

Aspect 7: The composition of any one of aspects 1-5, wherein the polysiloxane is a phenylsilicone.

Aspect 8: The composition of any one of aspects 1-5, wherein the polysiloxane is a methylsilicone.

Aspect 9: The composition of any one of aspects 1-8, wherein the vulcanization catalyst is a metal salt of carboxylic acids.

Aspect 10: The composition of any one of aspects 1-9, wherein the repair-enabling filler are particles having an average particle size from about 100 nm to 250 µm.

Aspect 11: The composition of any one of aspects 1-10, wherein the repair-enabling filler comprises one or more materials selected from the group consisting of quartz, titania, and fused silica, or a combination thereof.

Aspect 12: The composition of any one of aspects 1-11, wherein the repair-enabling filler is homogenously dispersed in the composition.

Aspect 13: The composition of any one of aspects 1-12, wherein the composition further comprises one or more additives selected from the group consisting of a colorant, an electrically conductive material, a thermally conductive material, an UV absorber, an adhesion promoter, or a matting agent, or a combination thereof.

Aspect 14: The composition of any one of aspects 1-13, wherein the composition further comprises a solvent.

Aspect 15: The composition of any one of aspects 1-14, wherein the composition is cured.

Aspect 16: The composition of any one of aspects 1-15, wherein the composition is a film having a thickness from about 5 µm to about 1300 µm.

Aspect 17: The composition of any one of aspects 1-16, wherein the repair-enabling filler is present from about 30 to about 130 parts by weight with respect to the polysiloxane, such that the cured coating maintains flexibility to the extent that it is able to elongate a minimum of 40% without being permanently damaged.

Aspect 18: A method comprising the steps of:
a) removing an area of a cured coating that is present on a substrate, thereby exposing the substrate;
b) smoothing the cured coating that borders the exposed substrate;
c) applying the composition of any one of aspects 1-17 to the exposed substrate;
d) curing the applied composition from step c); and
e) removing any excess from the cured applied composition, thereby repairing the cured coating on the substrate.

Aspect 19: The method of claim 18, wherein removing the area of excess cured film removes a defect in the cured film.

Aspect 20: The method of aspects 18 or 19, wherein the defect comprises a delamination, tear, scuff, removed area of the cured film, bubbling, and score in the cured film.

Aspect 21: The method of any one of aspects 18-20, wherein removing the area of excess cured film has a thickness from about 5 µm to about 1300 µm.

Aspect 22: The method of any one of aspects 18-21, wherein removing the area of the cured film and smoothing the cured coating that borders the exposed substrate comprises sanding.

Aspect 23: The method of any one of aspects 18-22, wherein after sanding, the area repaired with the composition of claim 1 blends smoothly with the undamaged coating surface.

Aspect 24: The method of any one of aspects 18-23, wherein the substrate is selected from the group consisting of metals, plastics, and silicones, or a combination thereof.

Aspect 25: The method of any one of aspects 18-25, wherein applying the composition of claim 1 to the exposed substrate comprises spray coating, brush coating, dip coating, or roll coating.

Aspect 26: The method of any one of aspects 18-26, wherein the cured coating that is present on the substrate has the composition of any one of aspects 1-17.

E. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

1. Example 1

Provided herein is a working example of the composition disclosed herein. Coatings generated from this working example have the preferred properties disclosed herein (e.g. repairability and flexibility).

This working example has
a) Polysiloxane—a linear polysiloxane with 100 mol % of the backbone consisting of trifluoropropylmethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane;
c) vulcanization catalyst—dibutyltin diacetate at 0.15 parts by weight of polysiloxane;
d) repair-enabling filler—crushed quartz (trade name Min-U-Sil 5) with an average particle size of 5 microns at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

2. Example 2

Provided herein is a second working example of the composition disclosed herein. Coatings generated from this working example have the preferred properties disclosed herein (e.g. repairability and flexibility).

This working example has
a) Polysiloxane—a linear polysiloxane with 100 mol % of the backbone consisting of trifluoropropylmethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane
c) vulcanization catalyst—dibutyltin diacetate at 0.15 parts by weight of polysiloxane;
d) repair-enabling filler-fused silica (trade name 3M Fused Silica 40) with a particle size of 19-27 microns (Microtrac, 50%) at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

3. Example 3

Provided herein is a third working example of the composition disclosed herein. Coatings generated from this working example have the preferred properties disclosed herein (e.g. repairability and flexibility).

This working example has
a) Polysiloxane—a linear polysiloxane with 100 mol % of the backbone consisting of dimethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane;
c) vulcanization catalyst—dibutyltin diacetate at 0.15 parts by weight of polysiloxane;
d) repair-enabling filler-crushed quartz (trade name Imsil A-8) with a median particle size of 2.1 microns at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

4. Example 4

Provided herein is an example of a non-working composition. Coatings generated from this non-working example do not have the preferred properties disclosed herein (e.g. repairability and flexibility).

This non-working example has
a) Polysiloxane—a linear polysiloxane with 100 mol % of the backbone consisting of trifluoropropylmethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane;

c) vulcanization catalyst—dibutyltin diacetate at 0.15 parts by weight of polysiloxane;
d) filler-diatomaceous earth (trade name Celite 350) with a median particle size of 8 microns at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

5. Example 5

Provided herein is an example of a non-working composition. Coatings generated from this non-working example do not have the preferred properties disclosed herein (e.g. repairability and flexibility).

This non-working example has
a) Polysiloxane—a linear polysiloxane with 100 mol % of the backbone consisting of trifluoropropylmethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane;
c) vulcanization catalyst—dibutyltin diacetate at 0.15 parts by weight of polysiloxane;
d) filler—tabular alumina (Almatis T60) with a maximum particle size of 45 microns at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

6. Example 6

Provided herein is an example of a non-working composition. Coatings generated from this non-working example do not have the preferred properties disclosed herein (e.g. repairability and flexibility).

This non-working example has
a) Polysiloxane—a linear polysiloxane with 100 mol % of the backbone consisting of trifluoropropylmethylsiloxy units and terminated with dimethylsilanol groups in a viscosity range of 40,000 to 60,000 cP;
b) a silicon based crosslinker—a mixture of ethyltriacetoxysilane and methyltriacetoxysilane in a 70:30 ratio at 18 parts by weight of polysiloxane;
c) vulcanization catalyst—dibutyltin diacetate at 0.15 parts by weight of polysiloxane;
d) filler—calcium carbonate (trade name Vicron 15-15) with a median particle size of 3.5 microns at 85 parts by weight of polysiloxane;
e) reinforcing filler—fumed silica (trade name Degussa Aerosil 8202) at 15 parts by weight of polysiloxane; and
f) Additive—pigments used to achieve a desired color and appropriate hiding power in the material at 30 parts by weight of polysiloxane.

The working example can be used in a one-component or two-component configuration. In the two-component configuration the silicon based crosslinker and vulcanization catalyst are separated until mixing just prior to application.

A working example with a composition of Example 1 was applied to a substrate and cured for 72 hours at room temperature. The cured coating of the working example was durable and resistant to abrasion and wear. People walked on the cured coating and the cured coating did not scuff or tear. The cured coating was also cleaned with soap and water, which did not damage the cured coating.

In order to evaluate the composition's ability to be repaired two different substrates—one aluminum and the other silicone—were coated with a formulation of Example 1 and allowed to cure. A small section of the material was removed by taking a blade and cutting across it down to the bare substrate underneath. This mimics what could occur if the cured coating is subjected to a high force impact (e.g. debris strike on a vehicle or aircraft). An area around the damage is taped off to define a boundary for the repair. An orbital sander with 220 grit sandpaper was used to sand the coating down to the bare substrate. The removed cured coating became a fine powder in this process and was wiped away from the area of repair to provide for a controlled and well-defined interface between the full thickness cured coating and the bare substrate. Additional composition of Example 1 was applied to the sanded area and allowed to cure. Excess material was then removed with further sanding in order to blend the borders of the newly repaired areas with the existing substrate. After sanding the edge of the cured coating is smooth and gradual, meaning that the transition between bare substrate and full thickness coating is a gradient. This is achieved because of the repair-enabling filler in the composition.

FIGS. 1A-1C show the performance of the composition of Example 1. FIG. 1A shows a photo of the sanded, tapered edge of a non-limiting composition on an aluminum substrate, at 200× zoom. FIG. 1 shows that composition of Example 1 is sandable. The sandability of Example 1 is demonstrated in FIGS. 1B and 1C shows a height contour of the sanded, tapered edge of a non-limiting composition on an aluminum substrate, at 200× zoom. The measurements were taken using a Keyence VHX-5000 digital microscope.

The control composition in Example 5 is a composition without the repair-enabling filler. FIG. 2A shows a photo of gouges and built-up ridge of material caused by sanding the control composition in Example 5. The control composition tears and beads at the interface of the bare substrate, and a measurable step or roughness can be observed in the transition zone between bare substrate and full thickness of the cured coating, as shown in FIGS. 2B and 2C.

It is desirable to avoid a rough transition from the full thickness coating to the bare substrate to the composition when repairing the cured coating. This is because the thickness and appearance are not uniform. The lack of homogeneity and continuity in the repaired area also impacts the overall performance and functionality of the coating (e.g. barrier properties such as moisture, UV, chemical).

What is claimed is:

1. A composition comprising:
a) 100 parts by weight of a polysiloxane;
b) from 2 to 40 parts by weight of a silicon based crosslinker;
c) from 5 to 26 parts by weight of a reinforcing filler;
d) from 0.01 to 5 parts by weight of a vulcanization catalyst;
e) from 60 to 130 parts by weight of a repair-enabling filler, wherein the repair-enabling filler comprises particles having an average particle size from about 100 nm to 250 μm; and
f) a solvent, wherein the repair-enabling filler is present from about 60 to about 130 parts by weight with respect to the polysiloxane, such that a cured coating from the composition maintains flexibility to the extent that it is able to elongate a minimum of 40% without being permanently damaged, wherein the cured coating from the composition having the flexibility to the extent that it is able to elongate a minimum of 40% without being permanently damaged is sandable as determined following the procedure in ASTM D-3322 section 6.17.

2. The composition of claim 1, wherein the polysiloxane is a hydroxyl endblocked polydiorganosiloxane having a viscosity from 1000 to 250,000 cP at 25° C. and having one or more different organic radicals selected from the group consisting of methyl, ethyl, phenyl, and 3,3,3-trifluoropropyl.

3. The composition of claim 1, wherein the silicon based crosslinker is an alkoxysilicon compound.

4. The composition of claim 1, wherein the silicon based crosslinker is an acetoxysilicon compound.

5. The composition of claim 1, wherein the silicon based crosslinker is a ketoximosilicon compound.

6. The composition of claim 1, wherein the polysiloxane is a fluorosilicone.

7. The composition of claim 1, wherein the polysiloxane is a phenylsilicone.

8. The composition of claim 1, wherein the polysiloxane is a methylsilicone.

9. The composition of claim 1, wherein the vulcanization catalyst is a metal salt of carboxylic acids.

10. The composition of claim 1, wherein the repair-enabling filler comprises one or more materials selected from the group consisting of quartz, titania, and fused silica, or a combination thereof.

11. The composition of claim 1, wherein the repair-enabling filler is homogenously dispersed in the composition.

12. The composition of claim 1, wherein the composition further comprises one or more additives selected from the group consisting of a colorant, an electrically conductive material, a thermally conductive material, an UV absorber, an adhesion promoter, or a matting agent, or a combination thereof.

13. The composition of claim 1, wherein the composition is a film having a thickness from about 5 μm to about 1300 μm.

14. The composition of claim 1, wherein:
a) the polysiloxane is a linear polysiloxane with 100 mol % of the backbone consisting of trifluoropropylmethylsiloxy units;
b) the silicon based crosslinker is a mixture of ethyltriacetoxysilane and methyltriacetoxysilane;
c) the reinforcing filler is fumed silica;
d) the vulcanization catalyst is dibutyltin diacetate; and
e) the repair-enabling filler is crushed quartz.

15. The composition of claim 1, wherein:
a) the polysiloxane is a linear polysiloxane with the back bone consisting of a mixture dimethylsiloxy and diphenylsiloxy;
b) the silicon based crosslinker is methyltris(methylethylketoximo) silane;
c) the reinforcing filler is fumed silica;
d) the vulcanization catalyst is dibutyltin diacetate; and
e) the repair-enabling filler is crushed quartz.

16. A method comprising the steps of:
a) removing a portion of an area of a cured coating that is present on a substrate, thereby exposing a portion of an area of the substrate that corresponds to the area of the removed portion of the cured coating, which exposed portion of the substrate borders cured coating that was not removed;
b) smoothing the cured coating that borders the exposed area of the substrate;
c) applying the composition of claim 1 to the exposed area of the substrate;
d) curing the applied composition from step c); and
e) removing any excess of the cured applied composition, thereby repairing the cured coating on the substrate.

17. The method of claim 16, wherein removing the portion of the area of the cured coating removes a defect in the cured coating.

18. The method of claim 17, wherein the defect comprises a delamination, a tear, a scuff, a void in the cured coating, bubbling, or a score in the cured coating.

19. The method of claim 16, wherein the cured coating has a thickness from about 5 μm to about 1300 μm.

20. The method of claim 16, wherein removing the portion of the area of the cured coating and smoothing the cured coating that borders the exposed area of the substrate comprises sanding.

21. The method of claim 16, wherein the substrate is selected from the group consisting of a metal substrate, a plastic substrate, and a silicone substrate, or a combination thereof.

* * * * *